US006463837B2

(12) United States Patent
Andersen et al.

(10) Patent No.: US 6,463,837 B2
(45) Date of Patent: *Oct. 15, 2002

(54) GUIDING DEVICE FOR A SAW BLADE

(75) Inventors: Tom Erik Andersen, Halden; Jan Hansen, Kornsjø, both of (NO)

(73) Assignee: Emex As, Tistedal (NO)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/367,463

(22) PCT Filed: Mar. 20, 1998

(86) PCT No.: PCT/NO98/00092

§ 371 (c)(1), (2), (4) Date: Aug. 13, 1999

(87) PCT Pub. No.: WO98/43789

PCT Pub. Date: Oct. 8, 1998

(65) Prior Publication Data

US 2002/0033085 A1 Mar. 21, 2002

(30) Foreign Application Priority Data

Mar. 20, 1997 (NO) ........................................ 19971313

(51) Int. Cl.[7] ........................ B23D 45/06; B23D 47/08; B27B 5/18

(52) U.S. Cl. .................... 83/477.1; 83/471.2; 83/477.2; 83/490; 83/491; 83/604

(58) Field of Search ............................ 83/471.2, 471.3, 83/477, 477.1, 477.2, 490, 491, 605, 604

(56) References Cited

U.S. PATENT DOCUMENTS

| | | | | | |
|---|---|---|---|---|---|
| 1,063,210 | A | * | 6/1913 | Parks | |
| 1,364,356 | A | * | 1/1921 | Koning | 83/471.2 |
| 1,584,086 | A | * | 5/1926 | Fonda | |
| 2,208,582 | A | * | 7/1940 | Hollister | 83/471.3 |
| 2,505,958 | A | * | 5/1950 | Grierson | |
| 2,792,032 | A | * | 5/1957 | Olsen | |
| 4,184,394 | A | * | 1/1980 | Gjerde | 83/473 |
| 4,249,442 | A | * | 2/1981 | Fittery | 144/130 |
| 4,457,198 | A | * | 7/1984 | Price | 83/441 |
| 4,862,781 | A | * | 9/1989 | Lauffer | 83/477.1 |
| 4,962,685 | A | * | 10/1990 | Hagstrom | 83/397 |

FOREIGN PATENT DOCUMENTS

| | | |
|---|---|---|
| AT | 366 618 | 4/1982 |
| CH | 232 172 | 8/1944 |
| CH | 409 356 | 10/1966 |
| CH | 505 672 | 5/1971 |

(List continued on next page.)

*Primary Examiner*—Boyer Ashley
(74) *Attorney, Agent, or Firm*—Merchant & Gould, P.C.

(57) ABSTRACT

A guiding device for a rotatable, circular saw blade of a house-building saw. Such a saw comprises a bench-shaped stand (2) with a frame (98) which is movable therein and on which the saw blade (12) is rotatably mounted, and an operating mechanism (26) for raising and lowering the frame (98) in the stand (2). According to the invention the guiding device comprises guide elements (90, 92) whereby the frame (98) can also be moved along the bench surface (4) after the frame (98) has been moved to near an upper position.

7 Claims, 3 Drawing Sheets

FOREIGN PATENT DOCUMENTS

| | | | |
|---|---|---|---|
| CH | 625 739 | * | 10/1981 |
| DE | 941 023 | | 3/1956 |
| DE | 12 52 403 | | 10/1967 |
| DE | 83 117 | * | 10/1970 |
| DE | 1 920 062 | * | 10/1970 |
| DE | 21 13 784 | | 11/1972 |
| DE | 23 63 898 | * | 7/1975 |
| DE | 29 03 574 | | 9/1979 |
| DE | 40 04 705 | | 8/1990 |
| DK | 102700 | | 12/1965 |
| EP | 0 014 569 | * | 9/1980 |
| EP | 014 869 | | 9/1980 |
| EP | 341679 | | 11/1989 |
| EP | 633 105 | | 1/1995 |
| GB | 2 299 968 | | 10/1996 |
| NO | 821 330 | * | 10/1983 |

* cited by examiner

GUIDING DEVICE FOR A SAW BLADE

CROSS REFERENCES TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable

BACKGROUND OF THE INVENTION

1. Field of the Invention

The invention relates to a guiding device for a rotatable, circular saw blade of a saw, which saw comprises a bench surface plane and a frame which is movable in a supporting structure of the saw and on which frame a motor for driving the saw blade is mounted, which guiding device is arranged for operational cutting movement of the frame along a circular path between a lower position, wherein the saw blade is located completely under the bench surface plane, and an upper position, wherein a circle segment of the saw blade is located above the bench surface plane, wherein the guiding device comprises an arm the end sections of which are linked to the structure and to the frame.

2. Description of the Related Art

In known saws of this type the frame can also support a motor for operation of the saw blade which may be plate-shaped and extend along a saw blade plane. Furthermore, the frame can be supported by the stand via a rotating device mounted rotatably in the stand, the upper part of which device can have a circular disk which is level with the bench surface, and wherein there is provided a slot through which the saw blade can be passed during raising and lowering by means of the operating mechanism. By turning the rotating device the frame and the saw blade can be rotated about a vertical axis, thus enabling sections to be sawed in a blank which extend at an angle in relation to one another. In addition the saw may include a device whereby the saw blade can be tilted about a horizontal axis which extends in the saw blade plane.

During a rotation of such a saw blade which partly projects up from the bench surface, successive saw blade sections which are located under the bench surface are first moved upwards through the slot, then become horizontal at the point which is located vertically above the centre of the saw blade, and finally downwards through the slot.

If a long blank has to be cleft, i.e. split along its longitudinal direction, the rotating device is set in such a manner that the saw blade plane extends parallel to a support strip which is connected to the stand and extends parallel to the bench plate, and the blank is placed against the support strip. The saw blade is then lifted via the frame in such a manner that the saw blade's upper section extends at a suitable height over the blank, the frame is secured in relation to the stand by suitable means, and the blank moved towards the saw by those sections of the saw blade segment which are successively moved downwards towards the bench surface during the rotation of the saw blade. The blank is hereby influenced by a force which attempts to press it downwards and the blank thus comes into secure abutment against the bench surface while simultaneously being capable of being pushed towards the saw blade. That section of the saw blade, or more precisely that section of the saw blade segment which at a moment during the rotation faces the blank will hereinafter be described as the front section of the saw blade. Similarly, that section of the saw blade which at the moment faces away from the blank and which is moved upwards, will be described as the rear section of the saw blade. That section of the saw blade which is located substantially at the centre of the saw blade and which at the moment is substantially moved horizontally will be described as the central section of the saw blade.

If the length of the blank is greater than the half chord of the segment of the saw blade which projects up through the slot, before the blank has been completely split, the blank may have two adjacent sections which have been conveyed past the central section, and which are connected via a third, not yet sawn-off section, which is located in front of the front section of the saw segment. Due to an internal tension in the third blank section the two split adjacent sections may be moved towards each other. If the tension is sufficiently great, the saw blade may be clamped between the adjacent sections, with the result that an upwardly directed force is exerted on the blank, which force attempts to fling it up at great speed. If the blank is flung up, it may result in personal injury.

If the two adjacent sections are so long that they extend behind the saw blade before the blank has been completely split, a clamping of the saw blade can be avoided if a plate-shaped splitting element, also called a riving knife, is provided behind the saw blade, this knife being securely fixed to the frame. The riving knife is hereby level with the saw blade, and the riving knife's plate thickness substantially corresponds to the saw blade's plate thickness. The riving knife normally extends along and close to the rear periphery of the saw blade up to a level immediately below the saw blade's uppermost section, i.e. to near the saw blade's central section. If a riving knife is provided and an attempt is made to move the two adjacent sections of a long blank towards each other, they can cause the riving knife only to be clamped, and not the saw blade, and therefore no attempt is made by the saw blade to move the blank upwards, thus avoiding personal injury.

If the blank has to be cut after splitting, the rotating direction is rotated 90°, with the result that the saw blade plane extends across the support strip's longitudinal direction and the riving knife is located on the side of the saw blade which faces away from the support strip. The blank is then placed against the support strip, whereupon the saw blade is raised for sawing the blank. If the width of the blank does not exceed the length of that section of the saw blade which is exposed by the riving knife, viewed from above, when it is raised the saw blade will be able to cut the blank. If this length is exceeded, however, the riving knife will be able to come into abutment against the bottom of the blank, preventing the saw blade from being inserted in the blank and possibly lifting it. Thus the relatively long riving knife severely restricts the potential cutting width for the saw blade. The riving knife, however, should not be removed, since during cutting a clamping of the saw blade may also occur with the risk of personal injury. It is a regrettable fact, however, that many craftsmen remove the riving knife, since it causes too great a reduction in the saw's capacity.

A saw of the type which is mentioned in the introduction is also known from DK-A-102700 which is considered to represent the closest prior art. This publication shows a guiding device for a rotatable circular saw blade of a saw, which saw comprises a bench shaped stand with a bench surface, the top of which extends in a bench surface plane, and a frame which is moveable in the stand and on which the saw blade is rotatably mounted. The guiding device is arranged for movement of the frame along a circular path between a lower position, wherein the saw blade is located completely under the bench surface plane, and an upper position, wherein a circle segment of the saw blade is located above the bench surface plane. For this purpose the guiding device comprises an arm, the end sections of which are linked to the frame and to the stand. The guiding device also comprises a circular slot in the stand. Another arm, linked to the stand, serves for guiding a riving knife, which knife is also linked to the frame. Thus, the other arm does not serve for guiding the frame.

BRIEF SUMMARY OF THE INVENTION

The object of the invention is to provide a guiding device of the type mentioned in the introduction which permits an increase in the saw's cutting width, thereby eliminating the above-mentioned disadvantages.

The characteristics of the guiding device according to the invention are presented in the characteristic features stated in the claims.

The invention will now be described in more detail with reference to the drawing which schematically illustrates embodiments of the guiding device according to the invention.

Figure 2:
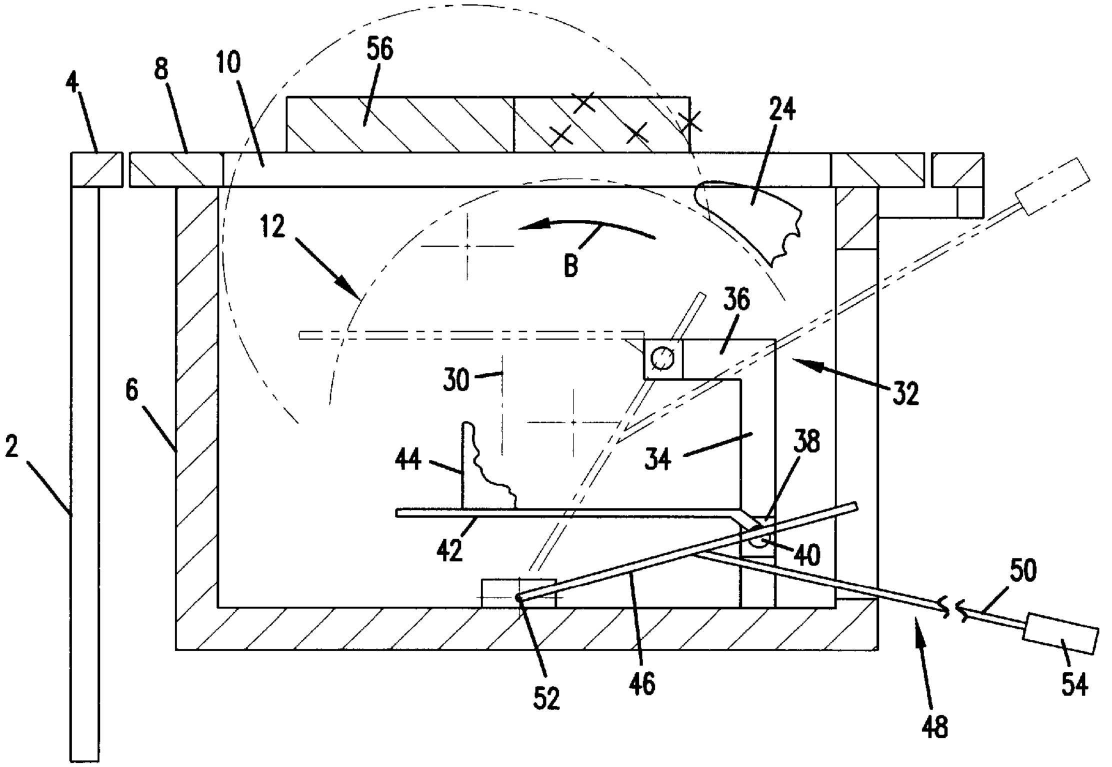
FIG. 2 shows a section along line II—II, through the house-building saw which is illustrated in FIG. 1, where the saw has a frame with a first embodiment of a guiding device.
Figure 3:
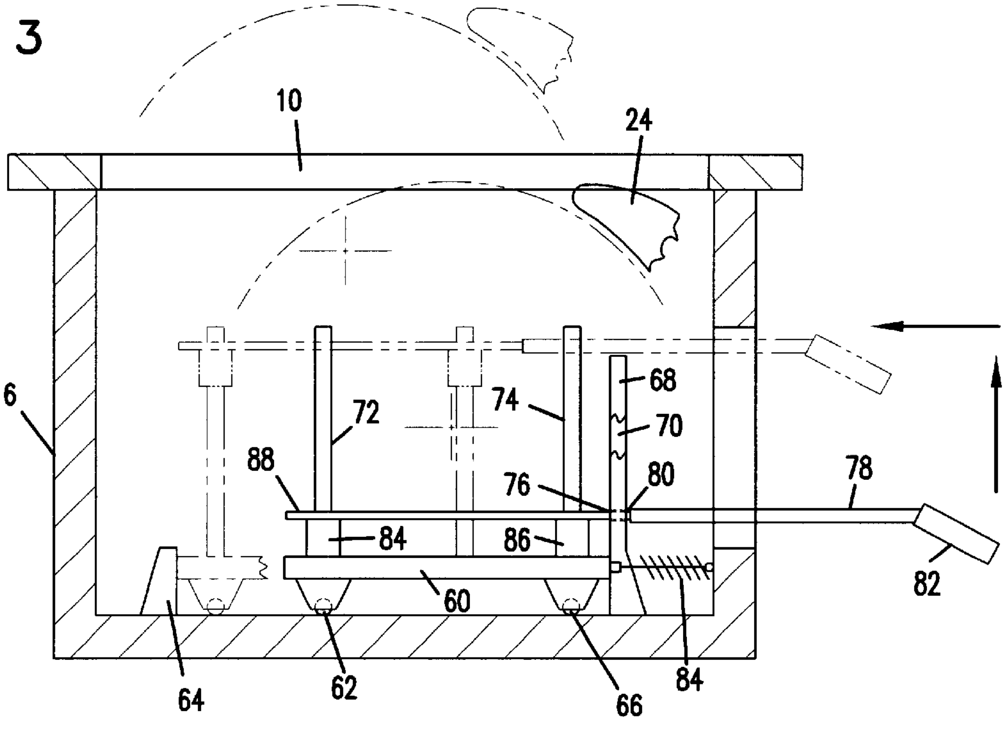
FIG. 3 is a view resembling that illustrated in FIG. 2, but where a second embodiment of the guiding device is shown.

The FIGS. 2 and 3 are not embodiments covered by the claim, but serve only for the purpose of giving a better understanding of the invention.

Some components with the same function have similar reference numerals in the various figures.

DETAILED DESCRIPTION OF THE INVENTION

Figure 1:
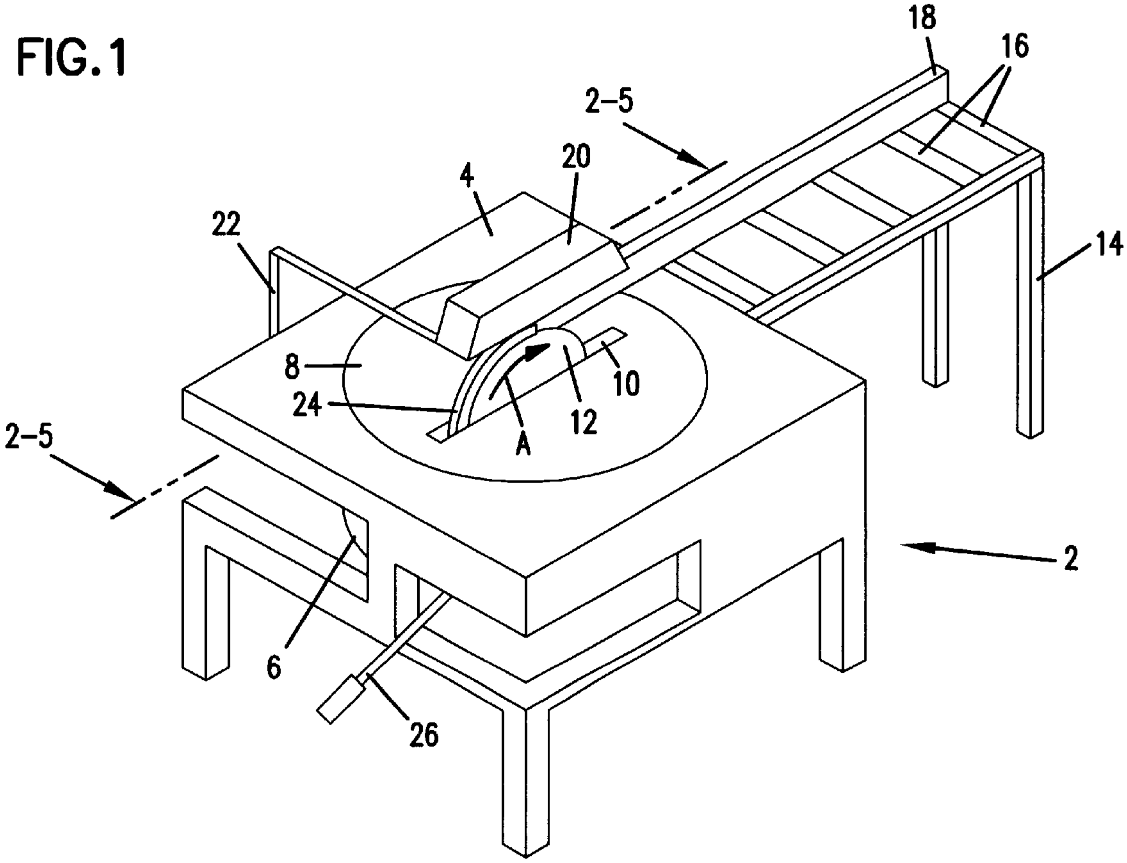
FIG. 1 is a perspective view of a house-building saw.

As illustrated in FIG. 1, a house-building saw comprises a bench-shaped stand 2, with a bench surface 4. In the stand 2 there is provided a rotating device 6 with an upper disk 8 which is level with the bench surface 4.

In the disk there is provided a vertical through-going slot 10 through which there extends a circular saw blade 12 which is arranged to rotate in the direction of the arrow A.

On the side of the stand 2 which is located at those sections of the saw blade which during its rotation are successively moved down into the slot, hereinafter called the front section of the saw blade, there is attached to the stand an additional stand 14 which is equipped with a number of rollers 16 the tops of which are level with the top of the bench surface 4. To one side of the additional stand 14 there is affixed a horizontal support strip 18 which extends over and along the rollers 16 and over the bench surface 4.

Above the saw blade there is provided a protective hood 20 which is connected via a rod 22 to the rotating device 6 and can rotate with it and thereby the saw blade 12, with the result that it is constantly located above it.

Behind the saw blade there is provided a riving knife 24, and for raising and lowering of the saw blade there is provided an operating arm 26. It should be understood that the house-building saw which is illustrated in FIG. 1 may have an operating mechanism with a device which permits the operating arm 26 to extend from the stand at the same point in relation to the stand independently of the rotating device's rotational position. For the sake of clarity, however, such a device has been omitted from the drawing.

FIG. 2 shows a section through a house-building saw which is illustrated in FIG. 1. In a stand 2 of the saw there is provided a rotating device 6 which is arranged to be rotated in relation to the stand 2 about a vertical axis 30 by means of bearing elements (not shown) and after rotating to be secured in the stand by holding means (not shown). The stand has a horizontal bench plate 4 which is level with a disk 8 of the rotating device 6.

To the stand there is attached a U-shaped guide channel 32 with a first, vertical channel section 34, the upper part of which communicates with a second, horizontal channel section 36. In the guide channel 32 there is inserted, e.g., a parallelepiped slide block 38, which is arranged to slide up and down in the first channel section 34, since it abuts against this channel section's lateral flanges with a first pair of opposite sides, and to slide horizontally in the second channel section 36, since it then abuts against this channel section's lateral flanges with a second pair of opposite sides. A section of the slide block 38 projects outside the channel.

In the section of the slide block 38 which projects outside the channel 32, there is provided a horizontal bore which extends parallel to the lateral flanges of the channel 32 wherein there is located a cylindrical pin 40 which in turn is so long that it protrudes outside the slide block 38, and which is arranged to rotate about its longitudinal axis. In the section of the pin 40 which projects outside the slide block 38 and the channel there is provided a cross bore.

To the slide block 38 there is attached a frame or a board 42 which can support an electric motor 44 (partially shown), on whose shaft there is mounted a saw blade 12 (illustrated by a dot-dash line).

A first end of a first rod section 46 of an operating rod device 48 is rotatably mounted in the rotating device via a rotating pin 52. The second end of the first rod section 46 is passed through the cross bore in the pin 40, this rod section being capable of sliding in this bore. A second rod section 50 extends out of the rotating device and the stand and has an operating handle 54. By raising and lowering of the operating handle 54, the operating rod 48 can be rotated about the rotating pin 52.

On the side of the operating arm facing the reader there may be provided a vertically extending profile (not shown) which is attached to the rotating device, and which extends along the channel sections, preventing the slide block 38 and the pin 40 from being moved out of the guide channel.

From near the upper section of the saw blade 12 towards the right of this figure, i.e. behind the saw blade, there extends downwards and along the periphery of the saw blade a riving knife 24 which is attached to the frame 42 by suitable means (not shown), the saw blade's direction of rotation being indicated by the arrow B.

When cutting a blank 56, the latter is placed above the saw blade to the left of a vertical line through the left-hand end of the saw blade 12, whereupon the operating handle can be gripped by an operator and raised. There is thereby exerted on the slide block 38 an upwardly directed force which results in a raising of the frame 42 and thereby the saw blade 12. Since the riving knife 24 is located on the right of the blank 56, the upper section of the saw blade 12 can penetrate the blank 56 and saw it. Under continued rotation of the first rod section 46 about the rotating pin 52, there is exerted by this rod section 46 on the slide block 38 a force whose direction gradually extends at a progressively greater angle towards the left lateral flange of the first channel section 34 and makes increasingly forceful attempts to push the slide block 38 towards the left. When the slide block's upper lateral surface abuts against the upper lateral flange of the second channel section 36, the saw blade 12 has been moved the maximum amount upwards. The lateral support from the left lateral flange of the first channel section thereby also ceases and the slide block 38 is moved horizontally into the second channel section 36. The saw blade is also hereby moved horizontally until the slide block reaches a left end wall of the second channel section 36.

Similarly, the slide block 38 is moved back and the frame and the saw blade are lowered by lowering the handle 54. If there is a risk of the slide block becoming wedged, an additional guide channel may be provided and two interconnected, parallel, first rod sections can be provided, which influence respective slide blocks in the guide channels.

In FIG. 3 there is illustrated a second embodiment of a guiding device according to the invention, where a carriage 60 with wheels 62 can slide on a horizontal section of the rotating device 6. The carriage's horizontal movement is restricted by a left and a right stopper 64 and 66 respectively. A carriage movement across the drawing plane can be restricted by means of suitable lateral guiding devices. From the right stopper 66 there projects a fork-shaped, flat profile 68 with a vertical slot 70 which is open at the top.

Two vertical columns 72 and 74 respectively extend upwardly from the carriage. A frame or plate 88 has vertically extending holes which are adapted to the columns with respect to diameter and position, and the columns are inserted in the respective holes, thus enabling the frame to slide up and down on the columns as it is controlled thereby. The holes may be provided in enlarged sections 84, 86 of the frame in order to achieve a better guiding thereof.

On its right side the frame 88 is securely connected with a first rod section 76 which extends with clearance through the slot 70 in the flat profile 68. The right end of the first rod section 76 is connected to a second rod section 78 with a larger diameter than the first rod section 76, with the result that a shoulder 80 is provided at the connection between them. The second rod section extends out through the rotating device and the stand and is terminated by a handle 82. On the frame 88 there is provided an electric motor (not shown), which supports a saw blade (indicated by a dot-dash line in a lower and an upper position).

The flat profile 68 is terminated on a lower level than the columns 72, 74. A relatively weak tension spring 84 is attached between the right end of the carriage and an overlying section of the rotating device.

When sawing a blank (not shown) the handle 82 is gripped by an operator and raised. The frame 88 thereby slides on the columns 72, 74 and the saw blade 12 penetrates the blank from below. The vertical profile 68 and the shoulder 80 hereby prevent movement of the frame 88 to the left. When the first rod section 76 is moved out of the slot 70 and the shoulder 80 has been moved to such an extent that it extends above the profile 68, by pushing the handle, the frame 88 and the saw blade can be moved to the left, resulting in a complete cutting of a wide blank.

Figure 4:
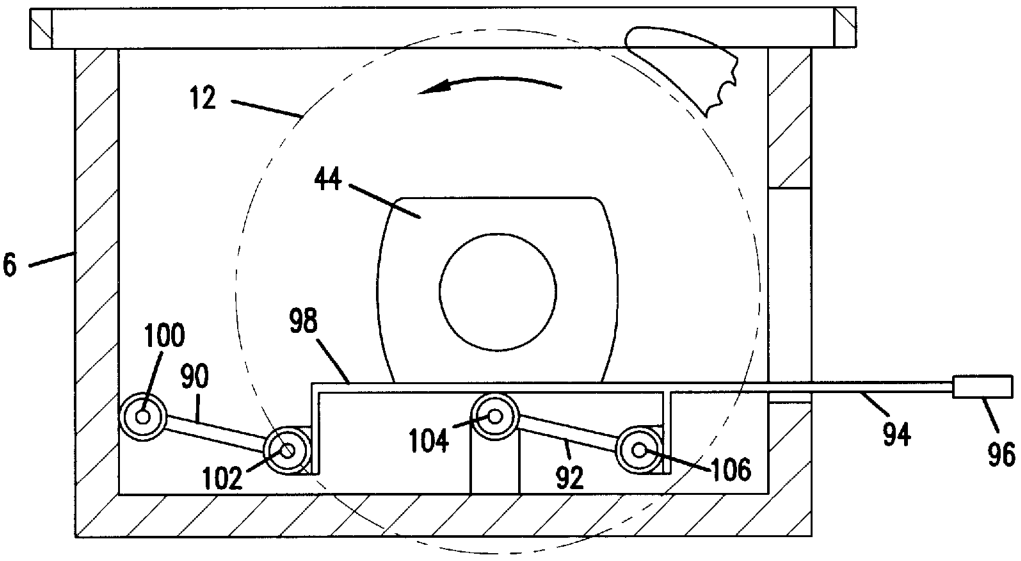
FIG. 4 is a view resembling that illustrated in FIG. 2, but where a third embodiment of the guiding device is shown, and where the frame is located in the lower position.
Figure 5:
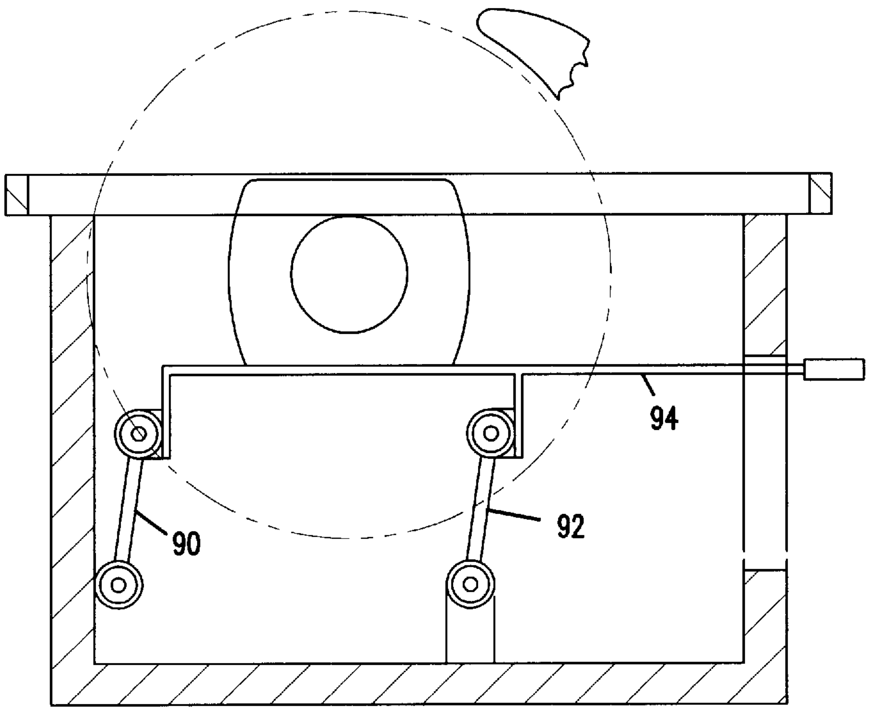
FIG. 5 is a view of the guiding device illustrated in FIG. 4, but where the frame is located in the upper position.

In FIGS. 4 and 5 there is illustrated a third, preferred embodiment of a guiding device according to the invention.

A frame 98 which supports a motor 44 on whose shaft there is mounted a saw blade 12, is rotatably connected via two parallel arms 90 and 92 respectively with the rotating device 6 via respective rotating joints 100, 102 and 104, 106. To the frame 98 there is attached an operating rod 94 with a handle 96. As illustrated in FIG. 4, the parallel arms 90, 92 extend slightly slopingly downwards towards their respective connection points on the frame 12 when the latter is located in its lower position. In the upper position of the frame 98 they extend substantially vertically.

By gripping the handle 96 when the frame 98 is located in its lower position as indicated in FIG. 4, and moving the handle 96 upwards, the saw blade will be moved upwards along a substantially vertical path section. As this upward movement of the handle 96 is continued, this path section will be transformed into a substantially horizontal path section which is terminated when the frame 98 has reached the position which is shown in FIG. 5.

With the guiding device according to the invention the aim is achieved of being able to cut blanks which are much wider than those which can be cut with the known saws of the same size.

Moreover, the entire cutting operation can be performed with less force, since the cutting sections of the saw blade during the final cutting phase wherein the saw blade is moved horizontally or substantially horizontally, attempt to move the blank downwards towards the bench surface instead of the saw blade attempting to lift the blank, which otherwise has to be counteracted by the operator who has to press it down while simultaneously lifting the frame. When cutting with a saw with a guiding device according to the invention, when performing the first cutting of a blank, operators experience a surprising, new movement of the saw blade, after which they find this movement very comfortable and requiring little force. At the same time they are not motivated to remove the riving knife since this no longer reduces the cutting width.

What is claimed is:

1. A saw apparatus comprising:

a stand having an upper work surface with a slot formed through the work surface;

a frame supported by said stand and movable toward and away from the upper work surface between a first position and a second position;

a motor mounted on said frame, said motor including a drive shaft;

a circular saw blade mounted on said drive shaft, said saw blade being positioned such that said saw blade is entirely disposed beneath the upper work surface when said frame is at the first position and at least a portion of said saw blade projects upwardly through said slot and above the upper work surface when said frame is at the second position;

first and second pivot arms connecting said frame to said stand, said first and second pivot arms being spaced from each other in a direction parallel to a longitudinal axis of said slot, and said first and second pivot arms each having a first end that is connected to said frame by a first pivot joint and a second end that is connected to said stand by a second pivot joint, said first and second pivot arms are oriented substantially parallel to the upper work surface when said frame is at the first position and said first and second pivot arms are oriented substantially perpendicular to the upper work surface when said frame is at the second position; and an operating rod connected to said frame and projecting from said stand, whereby when said operating rod is actuated, said frame is actuated to move between the first and second positions and said first and second pivot arms move simultaneously between the substantially parallel and substantially perpendicular orientations.

2. The saw apparatus according to claim 1, wherein said operating rod is mounted so tat it is liftable upward toward said upper work surface, and wherein said pivot arms, said operating rod and said frame are interconnected so that said frame is actuated to move from the first position to the second position when said operating rod is lifted upward toward said upper work surface.

3. The saw apparatus according to claim 1, wherein said stand includes a workpiece side that receives a workpiece to be cut by said saw blade, and wherein said saw blade moves toward said workpiece side as said frame moves from the fist position to the second position.

4. The saw apparatus according to claim 1, wherein the first pivot joints are located an equal distance from the upper work surface, and said distance changes as said frame moves between the first and second positions.

5. The saw apparatus according to claim 4, wherein the second pivot joints are located the same, constant distance from the upper work surface.

6. A saw apparatus comprising:

a stand having an upper work surface with a slot formed through the work surface, said stand including a rotating device rotatably supported thereby so as to be rotatable relative thereto, said rotating device includes an upper disk that defines at least a portion of the upper work surface and in which said slot is formed;

a frame supported by said stand and movable toward and away from the upper work surface between a first position and a second position;

a motor mounted on said frame, said motor including a drive shaft;

a circular saw blade mounted on said drive shaft said saw blade being positioned such that said saw blade is entirely disposed beneath the upper work surface when said frame is at the first position and at least a portion of said saw blade projects upwardly through said slot and above the upper work surface when said frame is at the second position;

first and second pivot arms connecting said frame to said stand, said first and second pivot arms being spaced from each other in a direction parallel to a longitudinal axis of said slot, and said first and second pivot arms each having a first end that is connected to said frame by a first pivot joint and a second end that is connected to said stand by a second pivot joint, said first and second pivot arms are oriented substantially parallel to the upper work surface when said frame is at the first position and said first and second pivot arms are oriented substantially perpendicular to the upper work surface when said frame is at the second position; and an operating rod connected to said frame and projecting from said stand, whereby when said operating rod is actuated, said frame is actuated to move between the first and second positions and said first and second pivot arms move simultaneously between the substantially parallel and substantially perpendicular orientations.

7. The saw apparatus according to claim 6, wherein said frame is mounted in said rotating device, and the second ends of said first and second pivot arms are connected to said rotating device.

* * * * *